United States Patent
Seo

(10) Patent No.: US 9,804,447 B2
(45) Date of Patent: Oct. 31, 2017

(54) LIQUID CRYSTAL DISPLAY AND MANUFACTURING METHOD THEREOF

(71) Applicant: Samsung Display Co., Ltd., Yongin-si (KR)

(72) Inventor: Bong-Sung Seo, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 14 days.

(21) Appl. No.: 14/933,172

(22) Filed: Nov. 5, 2015

(65) Prior Publication Data

US 2016/0299382 A1    Oct. 13, 2016

(30) Foreign Application Priority Data

Apr. 13, 2015   (KR) .................. 10-2015-0051693

(51) Int. Cl.
   *G02F 1/1337*    (2006.01)

(52) U.S. Cl.
   CPC .. *G02F 1/133753* (2013.01); *G02F 1/133788* (2013.01); *G02F 2001/133757* (2013.01)

(58) Field of Classification Search
   None
   See application file for complete search history.

(56) References Cited

U.S. PATENT DOCUMENTS

| | | | | |
|---|---|---|---|---|
| 5,479,282 A | * | 12/1995 | Toko | G02F 1/133753 349/123 |
| 5,576,862 A | * | 11/1996 | Sugiyama | G02F 1/133753 349/124 |
| 6,313,896 B1 | * | 11/2001 | Samant | G02F 1/13378 349/124 |
| 6,522,379 B1 | * | 2/2003 | Ishihara | G02F 1/133753 349/139 |
| 7,133,099 B2 | | 11/2006 | Yoshida et al. | |
| 2005/0030458 A1 | * | 2/2005 | Sasabayashi | G02F 1/133707 349/129 |
| 2005/0146662 A1 | * | 7/2005 | Inoue | G02F 1/134363 349/129 |

(Continued)

FOREIGN PATENT DOCUMENTS

| | | |
|---|---|---|
| JP | 11133429 | 5/1999 |
| JP | 2007178835 | 7/2007 |

(Continued)

*Primary Examiner* — Ryan Crockett
(74) *Attorney, Agent, or Firm* — Cantor Colburn LLP

(57) ABSTRACT

A liquid crystal display includes: a lower panel in which a plurality of pixel areas is defined; an upper panel opposite to the lower panel and in which the plurality of pixel areas is defined, where each pixel area is divided into domains; a first alignment layer on the lower panel and photo-aligned to have sub alignment portions corresponding to the domains, respectively; and a second alignment layer on the upper panel and photo-aligned to have sub alignment portions corresponding to domains, respectively, where one of the sub alignment portions of the first alignment layer has no pretilt and remaining of the sub alignment portions of the first alignment layer has different pretilt directions, and one of the sub alignment portions of the second alignment layer has no pretilt and remaining of the alignment portions of the second alignment layer has different pretilt directions.

8 Claims, 15 Drawing Sheets

(56) References Cited

U.S. PATENT DOCUMENTS

| | | | | |
|---|---|---|---|---|
| 2008/0143930 | A1* | 6/2008 | Jin | G02F 1/1323 349/96 |
| 2009/0284702 | A1 | 11/2009 | Seo et al. | |
| 2010/0157223 | A1* | 6/2010 | Shin | G02F 1/133753 349/129 |
| 2011/0085097 | A1* | 4/2011 | Lee | G02F 1/133788 349/33 |
| 2016/0195783 | A1* | 7/2016 | Song | G02F 1/133753 349/143 |

FOREIGN PATENT DOCUMENTS

| | | |
|---|---|---|
| JP | 2008145700 | 6/2008 |
| JP | 2010181913 | 8/2010 |
| KR | 100182116 | 12/1998 |
| KR | 1020090120285 | 11/2009 |
| KR | 1020100072682 | 7/2010 |

* cited by examiner

LIQUID CRYSTAL DISPLAY AND MANUFACTURING METHOD THEREOF

This application claims priority to Korean Patent Application No. 10-2015-0051693 filed on Apr. 13, 2015, and all the benefits accruing therefrom under 35 U.S.C. §119, the content of which in its entirety is herein incorporated by reference.

BACKGROUND (a) Field

Exemplary embodiments of the invention relate to a liquid crystal display and a manufacturing method thereof, and more particularly, to a liquid crystal display and a manufacturing method thereof using photo-alignment.

(b) Description of the Related Art

Generally, a liquid crystal display includes a lower panel where a pixel electrode is formed, an upper panel where a common electrode is formed, and a liquid crystal layer interposed between the lower panel and the upper panel. When voltage is applied to the pixel electrode and the common electrode, alignment of liquid crystal molecules of the liquid crystal layer is changed, and as a result, light transmittance is controlled and thus an image is displayed.

Recently, a patterned vertical alignment ("PAV") mode, a super patterned vertical alignment ("SPVA") mode and the like, which are driven by dividing one pixel into many domains, have been developed to improve the viewing angle of the liquid crystal display. In the PVA mode and the SPVA mode, multi domains are typically formed by forming a slit pattern or a protrusion pattern.

SUMMARY

In a liquid crystal display in a patterned vertical alignment ("PVA") mode or a super patterned vertical alignment ("SPVA") mode, a separate process is typically used to form the slit pattern or the protrusion pattern, and an afterimage or a spot may be generated or transmittance may be reduced, due to the slit pattern or the protrusion pattern.

Exemplary embodiments of the invention relate to a liquid crystal display having a wide viewing angle and a manufacturing method thereof using photo-alignment.

An exemplary embodiment of the invention provides a liquid crystal display including: a lower panel in which a plurality of pixel areas is defined; an upper panel disposed opposite to the lower panel and in which the plurality of pixel areas is defined, where each pixel area is divided into first to fourth domains; a first alignment layer disposed on the lower panel and photo-aligned to have first to fourth sub alignment portions corresponding to the first to fourth domains, respectively; and a second alignment layer disposed on the upper panel and photo-aligned to have first to fourth sub alignment portions corresponding to the first to fourth domains, respectively. In such an embodiment, one sub alignment portion of the first to fourth sub alignment portions of the first alignment layer has no pretilt and remaining sub alignment portions of the first to fourth sub alignment portions of the first alignment layer has different pretilt directions from each other, and one sub alignment portion of the first to fourth sub alignment portions of the second alignment layer has no pretilt and remaining sub alignment portions of the first to fourth sub alignment portions of the second alignment layer has different pretilt directions from each other.

In an exemplary embodiment, the first domain may be positioned at an upper left side in each pixel area, the second domain may be positioned at an upper right side in each pixel area, the third domain may be positioned at a lower left side in each pixel area, and the fourth domain may be positioned at a lower right side in each pixel area.

In an exemplary embodiment, the one sub alignment portion of the second alignment layer having no pretilt may be adjacent to the one sub alignment portion of the first alignment layer having no pretilt in a diagonal direction.

In an exemplary embodiment, a pretilt direction of a sub alignment portion of the first alignment layer adjacent to the one sub alignment portion of the first alignment layer having no pretilt in the diagonal direction may be a vector sum direction of pretilt directions of the other two remaining sub alignment portions of the first alignment layer.

In an exemplary embodiment, the sub alignment portion of the first alignment layer adjacent to the one sub alignment portion of the first alignment layer having no pretilt in the diagonal direction may be a region in which an exposure is performed twice on the lower panel, and the other two remaining sub alignment portions of the first alignment layer may be regions in which the exposure is performed once on the lower panel.

In an exemplary embodiment, a pretilt direction of a sub alignment portion of the second alignment layer adjacent to the one sub alignment portion of the second alignment layer having no pretilt in the diagonal direction may be a vector sum direction of pretilt directions of the other two remaining sub alignment portions of the second alignment layer.

In an exemplary embodiment, the sub alignment portion of the second alignment layer adjacent to the one sub alignment portion of the second alignment layer having no pretilt in the diagonal direction may be a region in which an exposure is performed twice on the upper panel, and the other two remaining sub alignment portions of the second alignment layer may be regions in which the exposure is performed once on the upper panel.

In an exemplary embodiment, a pretilt direction of a domain of the first to fourth domains may be determined by a vector sum direction of pretilt directions of corresponding sub alignment portions of the first alignment layer and the second alignment layer.

In an exemplary embodiment, pretilt directions in the first to fourth domains may be arranged to rotate in a clockwise direction with respect to a center of the pixel area.

In an exemplary embodiment, pretilt directions in the first to fourth domains may be arranged to rotate in a counterclockwise direction with respect to the center of the pixel area.

Another exemplary embodiment of the invention provides a manufacturing method of a liquid crystal display including: providing an alignment material on a lower panel in which a plurality of pixel areas is defined, where each pixel area is divided into first to fourth domains; providing a first alignment layer having first to fourth sub alignment portions corresponding to the first to fourth domains, respectively, through a process of irradiating ultraviolet rays to the alignment material provided on the lower panel, where one sub alignment portion of the first to fourth sub alignment portions of the first alignment layer has no pretilt and remaining sub alignment portions of the first to fourth sub alignment portions of the first alignment layer has different pretilt directions from each other; providing an alignment material on an upper panel to be disposed opposite to the lower panel, where the plurality of pixel areas is defined in the upper panel; and providing a second alignment layer having first to fourth sub alignment portions corresponding to the first to fourth domains, respectively, through a process of irradiating the ultraviolet rays to the alignment material provided on the upper panel, where one sub alignment portion of the first to fourth sub alignment portions of the second alignment layer has no pretilt and remaining sub alignment portions of the first to fourth sub alignment portions of the second alignment layer has different pretilt directions from each other.

In an exemplary embodiment, the providing the first alignment layer may include: disposing a first mask on the lower panel on which the alignment material is provided; irradiating the ultraviolet rays to a portion of the alignment material on the lower panel corresponding to one region of two regions which divide the pixel area in a first direction through the first mask; disposing a second mask on the lower panel on which the alignment material is provided; and irradiating the ultraviolet rays to a portion of the alignment material on the lower panel corresponding to one region of two regions which divide the pixel area in a second direction through the second mask.

In an exemplary embodiment, the one sub alignment portion of the first to fourth sub alignment portions of the first alignment layer having no pretilt may be a region to which the ultraviolet rays is not irradiated by the first mask and the second mask.

In an exemplary embodiment, a sub alignment portion of the first alignment layer adjacent to the one sub alignment portion of the first alignment layer having no pretilt in the diagonal direction may be a region in which the ultraviolet rays is irradiated twice through the first mask and the second mask, and the other two remaining sub alignment portions of the first alignment layer may be regions in which the ultraviolet rays is irradiated once through any one of the first mask and the second mask.

In an exemplary embodiment, a pretilt direction of the sub alignment portion of the first alignment layer adjacent to the one sub alignment portion of the first alignment layer having no pretilt in the diagonal direction, in which the ultraviolet rays is irradiated twice through the first mask and the second mask, may be a vector sum direction of pretilt directions of the other two remaining sub alignment portions of the first alignment layer, in which the ultraviolet rays is irradiated once through any one of the first mask and the second mask.

In an exemplary embodiment, The providing the second alignment layer may include: disposing a third mask on the upper panel on which the alignment material is provided; irradiating the ultraviolet rays to a portion of the alignment material on the upper panel corresponding to the other region of the two regions which divide the pixel area in a first direction through the third mask; disposing a fourth mask on the upper panel on which the alignment material is provided; and irradiating the ultraviolet rays to a portion of the alignment material on the upper panel corresponding to the other region of the two regions which divide the pixel area in a second direction through the fourth mask.

In an exemplary embodiment, one sub alignment portion of the first to fourth sub alignment portions of the second alignment layer having no pretilt may be a region to which the ultraviolet rays are not irradiated by the third mask and the fourth mask.

In an exemplary embodiment, a sub alignment portion of the second alignment layer adjacent to the one sub alignment portion of the second alignment layer having no pretilt may be a region in which the ultraviolet rays are irradiated twice through the third mask and the fourth mask, and the other two remaining sub alignment portions of the second alignment layer may be regions in which the ultraviolet rays are irradiated once through any one of the third mask and the fourth mask.

In an exemplary embodiment, a pretilt direction of the sub alignment portion of the first alignment layer adjacent to the one sub alignment portion of the first alignment layer having no pretilt in the diagonal direction, in which the ultraviolet rays are irradiated twice through the third mask and the fourth mask, may be a vector sum direction of pretilt directions of the other two remaining sub alignment portions of the first alignment layer, in which the ultraviolet rays are irradiated once through any one of the third mask and the fourth mask.

In an exemplary embodiment, the one sub alignment portion of the second alignment layer having no pretilt may be adjacent to the one sub alignment portion of the first alignment layer having no pretilt in a diagonal direction.

According to exemplary embodiments of the invention described herein, the liquid crystal display may provide a wide viewing angle by implementing multi domains in a pixel area without forming a slit pattern or a protrusion pattern.

In such embodiments, anchoring energy, a response speed of the liquid crystal and transmittance of the liquid crystal display may be improved by implementing the multi domains using photo-alignment.

BRIEF DESCRIPTION OF THE DRAWINGS

These and/or other features of the invention will become apparent and more readily appreciated from the following detailed description of embodiments thereof, taken in conjunction with the accompanying drawings, in which.

DETAILED DESCRIPTION

Figure 1:
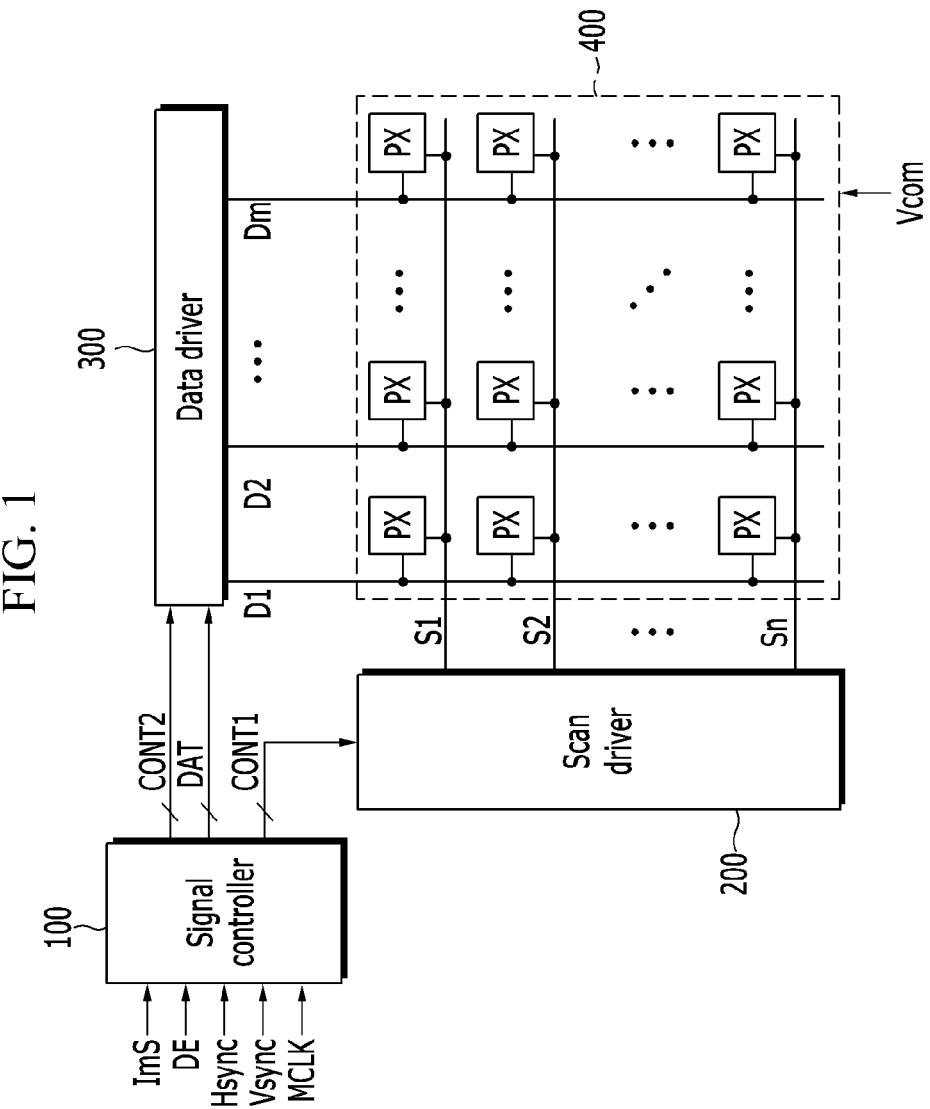
FIG. 1 is a block diagram illustrating an exemplary embodiment of a liquid crystal display according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a liquid crystal display according to the invention will be described with reference to the accompanying drawings.

FIG. 1 is a block diagram illustrating an exemplary embodiment of a liquid crystal display according to the invention.

Referring to FIG. 1, an exemplary embodiment of the liquid crystal display includes a signal controller 100, a scan driver 200, a data driver 300 and a display unit 400.

The display unit 400 includes a plurality of signal lines including a plurality of scan lines S1-Sn and a plurality of data lines D1-Dm, and a plurality of pixels PX. The pixels PX are connected to the plurality of signal lines S1-Sn and D1-Dm and arranged substantially in a matrix form. The plurality of scan lines S1-Sn extends substantially in a row direction to be substantially parallel to each other. The plurality of data lines D1-Dm extends substantially in a column direction to be substantially parallel to each other.

In an exemplary embodiment, the display unit 400 may be a liquid crystal panel assembly. In such an embodiment, the liquid crystal panel assembly includes a lower panel (see 10 of FIG. 2), an upper panel (see 20 of FIG. 2) disposed opposite to the lower panel, and a liquid crystal layer (see 15 of FIG. 2) interposed between the upper and lower panels 10 and 20. In such an embodiment, a polarizer (not illustrated), which polarizes light, may be attached onto at least one outer surface of the display unit 400.

The signal controller 100 receives an image signal ImS and an input control signal for controlling a display of the image signal. The image signal ImS stores luminance information of the plurality of pixels. The luminance displayed by each pixel may correspond to a predetermined number of grayscales, for example, $1024(=2^{10})$, $256(=2^8)$ or $64(=2^6)$ grayscales. The input control signal includes a data enable signal DE, a horizontal synchronization signal Hsync, a vertical synchronization signal Vsync and a main clock signal MCLK.

The signal controller 100 transfers an image data signal DAT and a data control signal CONT2 to the data driver 300. The data control signal CONT2, which is a signal for controlling an operation of the data driver 300, includes a horizontal synchronization start signal for notifying the transmission start of the image data signal DAT, an output signal for indicating the output of a data signal to the plurality of data lines D1-Dm, a data clock signal, and the like. The data control signal CONT2 may further include a reverse signal for inverting a voltage polarity of the image data signal DAT for the common voltage Vcom.

The signal controller 100 transfers the scan control signal CONT1 to the scan driver 200. The scan control signal CONT1, which is a signal for controlling an operation of the scan driver 200, may include a scan start signal in the scan driver 200, and at least one clock signal for controlling an output of the gate-on voltage. The scan control signal CONT1 may further include an output enable signal for limiting the duration of the gate-on voltage.

The data driver 300 is connected to the plurality of data lines D1-Dm disposed in the display unit 400, and selects a grayscale voltage corresponding to the image data signal DAT. The data driver 300 applies the selected grayscale voltage to the data lines D1-Dm as the data signal (data). The data driver 300 may generate grayscale voltages for all grayscales by dividing a predetermined number of reference grayscale voltages and select the grayscale voltage corresponding to the image data signal DAT from the grayscale voltages.

The scan driver 200 is connected to the plurality of scan lines S1-Sn disposed in the display unit 400 and applies a scan signal, which is generated based on a combination of a gate-on voltage and a gate-off voltage that turn on and off a switching element (see Q of FIG. 2), respectively, to the plurality of scan lines S1-Sn. The scan driver 200 may sequentially apply the gate-on voltage with the scan signal to the plurality of scan lines S1-Sn.

Each of the signal controller 100, the scan driver 200 and the data driver 300 described above may be directly disposed, e.g., mounted, on the display unit 400 in an integrated circuit ("IC") chip form, mounted on a flexible printed circuit film, attached to the display unit 400 in a tape carrier package ("TCP") form, or mounted on a separate printed circuit board. Alternatively, the signal controller 100, the scan driver 200 and the data driver 300 may be integrated on the display unit 400 together with the plurality of scan lines S1-Sn and the plurality of data lines D1-Dm.

In one exemplary embodiment, for example, the scan driver 200 may be defined by amorphous silicon gate ("ASG") mounted on the display unit 400. Further, the data driver 300 may be provided in a driving IC having a function of the signal controller 100.

Figure 2:
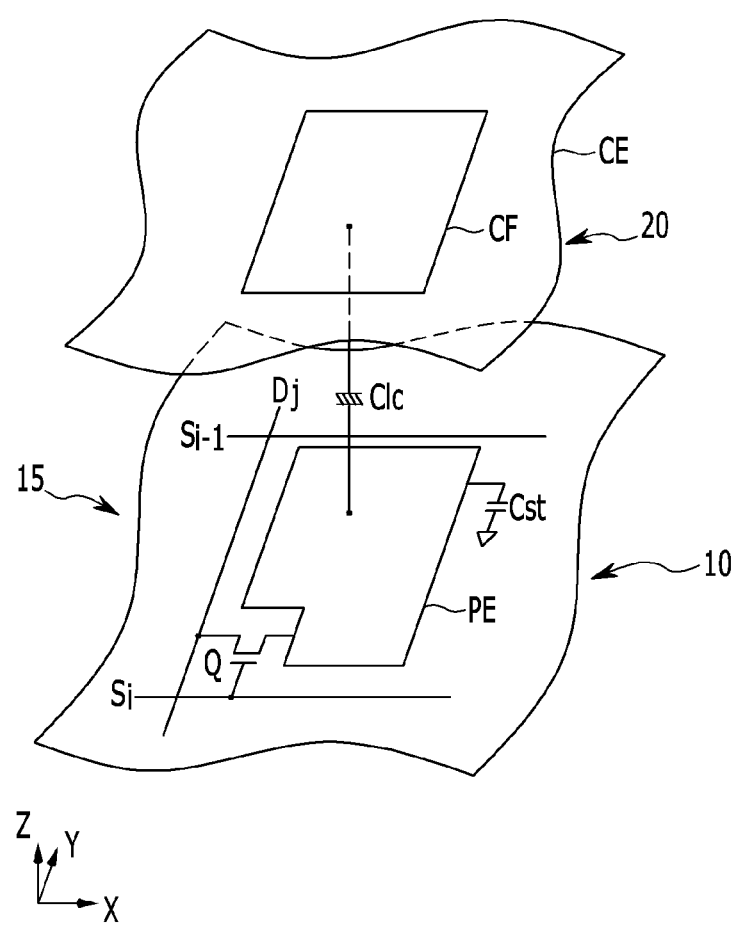
FIG. 2 is an equivalent circuit diagram of a pixel of an exemplary embodiment of the liquid crystal display according to the invention.

FIG. 2 is an equivalent circuit diagram of a pixel of an exemplary embodiment of the liquid crystal display according to the invention.

Referring to FIG. 2, a pixel PX of the display unit 400 will be described in detail. Herein, a pixel PX connected to an i-th scan line Si and a j-th data line Dj (1<i≤n, 1≤j≤m) will be described in greater detail as an example. The pixel PX includes a switching element Q, and a liquid crystal capacitor Clc and a storage capacitor Cst which are connected to the switching element Q.

In an exemplary embodiment, the switching element Q may be a three-terminal element such as a thin film transistor disposed on the lower panel 10. In such an embodiment, the switching element Q includes a gate terminal connected to the scan lines S1-Sn, an input terminal connected to the data lines D1-Dm, and an output terminal connected to the liquid crystal capacitor Clc and the storage capacitor Cst. The thin film transistor includes amorphous silicon or polycrystalline silicon.

In an exemplary embodiment, the thin film transistor may be an oxide thin film transistor ("oxide TFT") in which a semiconductor layer includes an oxide semiconductor.

In such an embodiment, the oxide semiconductor may include at least one selected from oxides based on titanium (Ti), hafnium (Hf), zirconium (Zr), aluminum (Al), tantalum (Ta), germanium (Ge), zinc (Zn), gallium (Ga), tin (Sn) or indium (In), and complex oxides thereof, e.g., zinc oxide (ZnO), indium-gallium-zinc oxide (InGaZnO4), indium-zinc oxide (Zn—In—O), zinc tin oxide (Zn—Sn—O), indium-gallium oxide (In—Ga—O), indium-tin oxide (In—Sn—O), indium-zirconium oxide (In—Zr—O), indium-zirconium-zinc oxide (In—Zr—Zn—O), indium-zirconium-tin oxide (In—Zr—Sn—O), indium-zirconium-gallium oxide (In—Zr—Ga—O), indium aluminum oxide (In—Al—O), indium-zinc-aluminum oxide (In—Zn—Al—O), indium-tin-aluminum oxide (In—Sn—Al—O), indium-aluminum-gallium oxide (In—Al—Ga—O), indium-tantalum oxide (In—Ta—O), indium-tantalum-zinc oxide (In—Ta—Zn—O), indium-tantalum-tin oxide (In—Ta—Sn—O), indium-tantalum-gallium oxide (In—Ta—Ga—O), indium-germanium oxide (In—Ge—O), indium-germanium-zinc oxide (In—Ge—Zn—O), indium-germanium-tin oxide (In—Ge—Sn—O), indium-germanium-gallium oxide (In—Ge—Ga—O), titanium-indium-zinc oxide (Ti—In—Zn—O), and hafnium-indium-zinc oxide (Hf—In—Zn—O).

The semiconductor layer includes a channel region in which impurities are not doped, and a source region and a drain region formed when impurities are doped at both sides of the channel region. Herein, the impurities may be variously selected based on the type of thin film transistor, and may be N-type impurities or P-type impurities.

In an exemplary embodiment, where the semiconductor layer is formed of the oxide semiconductor, a separate passivation layer may be disposed on the semiconductor layer to protect the oxide semiconductor which is vulnerable to an external environment such as exposure to a high temperature.

Two terminals of the liquid crystal capacitor Clc may be defined by the pixel electrode PE of the lower panel 10 and the common electrode CE of the upper panel 20, and a liquid crystal layer 15 between the pixel electrode PE and the common electrode CE functions as a dielectric material. The liquid crystal layer 15 has dielectric anisotropy.

In an exemplary embodiment, the pixel electrode PE is connected to the switching element Q. The common electrode CE may cover the entire surface of the upper panel 20 and receives a common voltage Vcom. In an alternative exemplary embodiment, the common electrode CE may be disposed on the lower panel 10, and at least one of the two electrodes PE and CE may have a linear shape or a rod shape.

The storage capacitor Cst, which plays a subordinate role of the liquid crystal capacitor Clc, is defined by a portion of a separate signal line (not illustrated) included in the lower panel 10 and a portion of the pixel electrode PE, which overlap each other, with an insulator therebetween, and a predetermined voltage such as a common voltage Vcom may be applied to the separate signal line.

A color filter CF may be disposed in a partial area of the common electrode CE of the upper panel 20. In an exemplary embodiment, each pixel PX uniquely displays one of the primary colors and enables a desired color to be recognized by a spatial sum of the primary colors. In an alternative exemplary embodiment, each pixel PX alternately displays the primary colors with time and enables a desired color to be recognized by a temporal sum of the primary colors. In one exemplary embodiment, for example, the primary colors may include the three primary colors of red, green and blue.

In one exemplary embodiment, for example, each pixel PX includes a color filter CF representing one of the primary colors in an area of the upper panel 20 corresponding to the common electrode CE, as shown in FIG. 2. In an alternative exemplary embodiment, the color filter CF may be disposed on or below the pixel electrode PE of the lower panel 10.

In an exemplary embodiment, a first alignment layer (not illustrated) may be disposed on the pixel electrode PE in the lower panel 10, and a second alignment layer (not illustrated) may be disposed on the common electrode CE in the upper panel 20. The first alignment layer and the second alignment layer have a plurality of sub alignment portions for every pixel area, and each sub alignment portion is photo-aligned to have different pretilt directions. The first alignment layer and the second alignment layer may have vertical alignment directions.

In such an embodiment, when an electric field is generated between the pixel electrode PE and the common electrode CE, liquid crystal molecules of the liquid crystal layer 15 react with the electric field to be realigned, and an image having a grayscale according to a difference in light transmission amount by the realigned liquid crystal molecules is displayed.

Hereinafter, the first alignment layer, the second alignment layer and the pretilt directions thereof in an exemplary embodiment of the liquid crystal display will be described in detail with reference to FIGS. 3 to 5.

Figure 3:
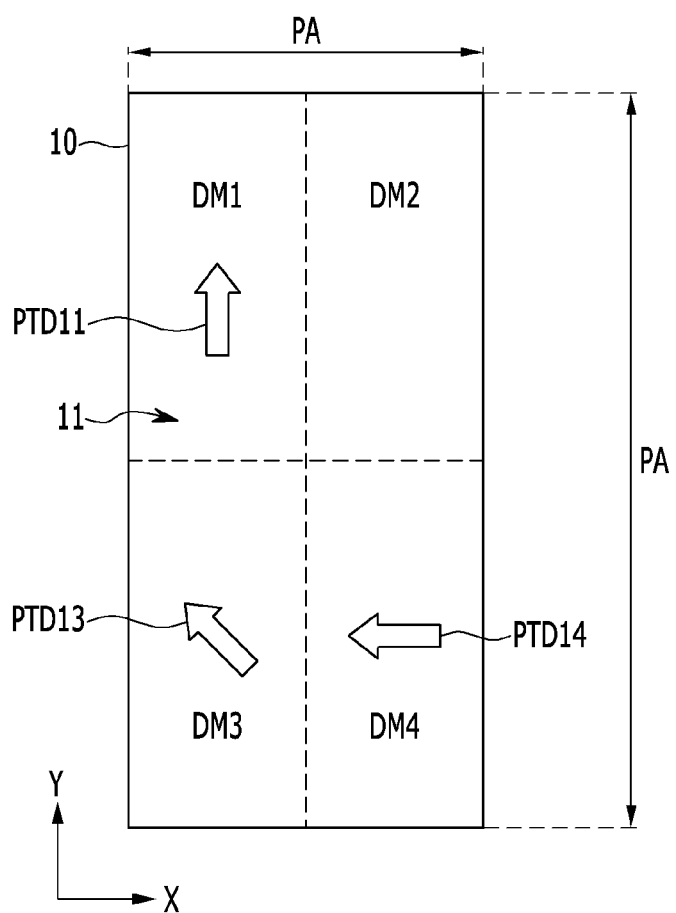
FIG. 3 is a plan view illustrating a first alignment layer of a lower panel in an exemplary embodiment of the liquid crystal display according to the invention.

FIG. 3 is a plan view illustrating a first alignment layer of a lower panel in an exemplary embodiment of the liquid crystal display according to the invention. FIG. 4 is a plan view illustrating a second alignment layer of an upper panel in an exemplary embodiment of the liquid crystal display according to the invention. FIG. 5 is a plan view illustrating coupling of the lower panel of FIG. 3 and the upper panel of FIG. 4.

Figure 4:
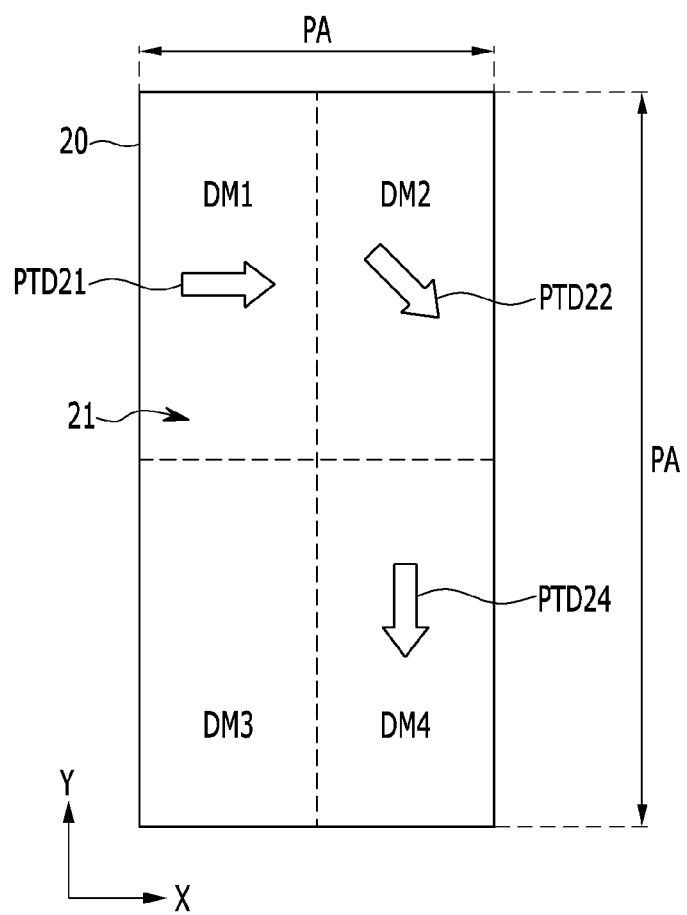
FIG. 4 is a plan view illustrating a second alignment layer of an upper panel in an exemplary embodiment of the liquid crystal display according to the invention.
Figure 5:
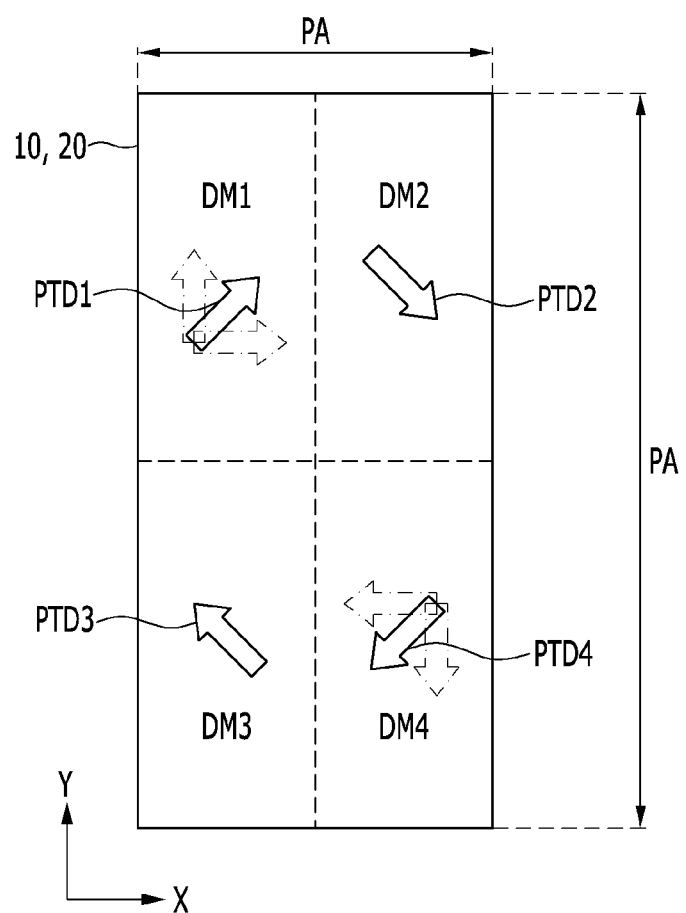
FIG. 5 is a plan view illustrating the lower panel of FIG. 3 and the upper panel of FIG. 4 which are coupled with each other.

Referring to FIGS. 3 to 5, in an exemplary embodiment, a plurality of pixel areas PA is defined in a matrix form in the lower panel 10 and the upper panel 20. The plurality of scan lines S1-Sn extends in a first direction X, and the plurality of data lines D1-Dm extends in a second direction Y. In such an embodiment, two adjacent scan lines define a long side of one pixel area PA, and two adjacent data lines may define a short side of one pixel area PA. The first direction X and the second direction Y may be substantially vertical to each other.

In an exemplary embodiment, the pixel area PA may be divided into four domains DM1 to DM4. In such an embodiment, as shown in FIGS. 3 to 5, the pixel area PA may include a first domain DM1 positioned at an upper left side, a second domain DM2 positioned at an upper right side, a third domain DM3 positioned at a lower left side, and a fourth domain DM4 positioned at a lower right side. In such an embodiment, the first domain DM1 and the second domain DM2 are adjacent to each other in the first direction X, and the third domain DM3 and the fourth domain DM4 are adjacent to each other in the first direction X. In such an embodiment, the first domain DM1 and the third domain DM3 are adjacent to each other in the second direction Y, and the second domain DM2 and the fourth domain DM4 are adjacent to each other in the second direction Y. The first direction X may be referred to as a horizontal direction, and the second direction Y may be referred to as a vertical direction. The first domain DM1 and the fourth domain DM4 are adjacent to each other in a diagonal direction (when viewed from a plan view), and the second domain DM2 and the third domain DM3 are adjacent to each other in a diagonal direction.

In an exemplary embodiment, as illustrated in FIG. 3, the first alignment layer 11 is disposed on the lower panel 10. In such an embodiment, as illustrated in FIG. 4, the second alignment layer 21 is disposed on the upper panel 20.

In an exemplary embodiment, the first alignment layer 11 has four sub alignment portions corresponding to four domains DM1 to DM4, respectively. In such an embodiment, the first alignment layer 11 includes a first sub alignment portion corresponding to the first domain DM1, a second sub alignment portion corresponding to the second domain DM2, a third sub alignment portion corresponding to the third domain DM3, and a fourth sub alignment portion corresponding to the fourth domain DM4.

In such an embodiment, three sub alignment portions among the first to fourth sub alignment portions of the first alignment layer 11 have different pretilt directions from each other, and the remaining one of the first alignment layer 11 has no pretilt. In such an embodiment, as shown in FIG. 3, the first sub alignment portion of the first alignment layer 11 has a pretilt direction PTD11 corresponding to the second direction Y, the fourth sub alignment portion of the first alignment layer 11 has a pretilt direction PTD14 corresponding to a reverse direction −X of the first direction X, the third sub alignment portion of the first alignment layer 11 has a pretilt direction PTD13 corresponding to a direction of a vector sum of the pretilt direction PTD11 of the first sub alignment portion and the pretilt direction PTD14 of the fourth sub alignment portion, and the second sub alignment portion of the first alignment layer 11 does not have a pretilt. In such an embodiment, a pretilt direction of the sub alignment portion corresponding to the third domain DM3, which is adjacent to the sub alignment portion corresponding to the second domain DM2 without the pretilt in a diagonal direction, becomes a vector sum direction of the photo-aligned pretilt directions in two remaining sub alignment portions corresponding to the first and fourth domains DM1 and DM4.

Herein, the pretilt means that some of the liquid crystal molecules included in the liquid crystal layer 15 are set in a pre-tilted state, and the pretilt direction means a pre-tilted direction of some of the liquid crystal molecules. Directors of the adjacent liquid crystal molecules in the first alignment layer 11 may be disposed substantially in parallel with the pretilt direction.

In an exemplary embodiment, similarly to the first alignment layer 11, the second alignment layer 21 has four sub alignment portions corresponding to four domains DM1 to DM4, respectively. In such an embodiment, the second alignment layer 21 includes a first sub alignment portion corresponding to the first domain DM1, a second sub alignment portion corresponding to the second domain DM2, a third sub alignment portion corresponding to the third domain DM3, and a fourth sub alignment portion corresponding to the fourth domain DM4.

In such an embodiment, three sub alignment portions among the first to fourth sub alignment portions of the second alignment layer 21 have different pretilt directions from each other, and the remaining one of the second alignment layer 21 has no pretilt. In such an embodiment, the sub alignment portion (e.g., the second sub alignment portion) without the pretilt in the first alignment layer 11 and the sub alignment portion (e.g., the fourth sub alignment portion) without the pretilt in the second alignment layer 21 do not overlap with each other. In one exemplary embodiment, for example, the domain DM2 of the sub alignment portion without the pretilt in the first alignment layer 11 and the sub alignment portion without the pretilt in the second alignment layer 21 are adjacent to each other in the diagonal direction, as shown in FIGS. 3 and 4.

Three sub alignment portions among the first to fourth sub alignment portions in the second alignment layer 21 have different pretilt directions from each other, and the remaining one in the second alignment layer 21 does not have a pretilt. In such an embodiment, the domain without the pretilt in the second alignment layer 21 is adjacent to the domain without the pretilt in the first alignment layer 11 in the diagonal direction. That is, the first sub alignment portion of the second alignment layer 21 has a pretilt direction PTD21 corresponding to the first direction X, the fourth sub alignment portion of the second alignment layer 21 has a pretilt direction PTD22 corresponding to a reverse direction −Y of the second direction Y, the second sub alignment portion of the second alignment layer 21 has a pretilt direction PTD22 corresponding to a direction of a vector sum of the pretilt direction PTD21 of the first sub alignment portion and the pretilt direction PTD24 of the fourth sub alignment portion, and the third sub alignment portion of the second alignment layer 21 does not have a pretilt. In such an embodiment, in the second alignment layer 21, a pretilt direction the sub alignment portion in second domain DM2, which is adjacent to the sub alignment portion in the third domain DM3 without the pretilt in a diagonal direction, becomes a vector sum direction of the photo-aligned pretilt directions in two remaining sub alignment portions in the first and fourth domains DM1 and DM4.

As such, the lower panel 10 and the upper panel 20 have different pretilt directions from each other.

In an exemplary embodiment, the liquid crystal display has four sub alignment portions corresponding to four domains DM1 to DM4, respectively. In such an embodiment, the pretilt direction of a domain of the liquid crystal display is determined by a vector sum direction of the pretilt directions of a corresponding sub alignment portion of the first alignment layer 11 of the lower panel 10 and a corresponding sub alignment portion of the second alignment layer 21 of the upper panel 20. As illustrated in FIG. 5, when the lower panel 10 and the upper panel 20 are coupled with each other, the domains of the liquid crystal display corresponding to the first sub alignment portion and the fourth sub alignment portion have the pretilt directions PTD1 and PTD4 determined by a vector sum direction of the pretilt direction of the corresponding sub alignment portion of the lower panel 10 and the pretilt direction of the corresponding sub alignment portion of the upper panel 20, respectively. In such an embodiment, since the second sub alignment portion of the lower panel 10 does not have the pretilt, the domain of the liquid crystal display corresponding to the second sub alignment portion has the pretilt direction PTD2 in the same direction as the pretilt direction PTD22 of the second sub alignment portion of the upper panel 20. In such an embodiment, since the third sub alignment portion of the upper panel 20 does not have the pretilt, the domain of on the liquid crystal display corresponding to the third sub alignment portion has the pretilt direction PTD3 in the same direction as the pretilt direction PTD13 of the third sub alignment portion of the lower panel 10. In such an embodiment, the one sub alignment portion of the second alignment layer 21 having no pretilt is adjacent to the one sub alignment portion of the first alignment layer 11 having no pretilt in a diagonal direction, when viewed from a top plan view In an exemplary embodiment, as shown in FIG. 5, the first to fourth pretilt directions PTD1 to PTD4 of the domains corresponding to the first sub alignments portion to the fourth sub alignment portions are arranged in a rotating form in a clockwise direction with respect to a center of the pixel area PA by coupling the lower panel 10 and the upper panel 20. In such an embodiment, the first pretilt direction PTD1 faces a direction of about 45° in a counterclockwise direction based on the first direction X, the second pretilt direction PTD2 faces a direction of about 45° in a clockwise direction based on the first direction X, the third pretilt direction PTD3 faces a direction of about 225° in a clockwise direction based on the first direction X, and the fourth pretilt direction PTD4 faces a direction of about 135° based on the first direction X. In an exemplary embodiment of the invention, the first to fourth pretilt directions PTD1 to PTD4 are not limited to those shown in FIG. 4. In one alternative exemplary embodiment, for example, the first to fourth pretilt directions PTD1 to PTD4 may be arranged in a rotating form in a counterclockwise direction with respect to the center of the pixel area PA.

In an exemplary embodiment, as described above, the pixel area PA is divided into four domains DM1 to DM4, and the pretilt directions of the respective domains DM1 to DM4 are differently determined in a vector sum direction of the pretilt directions of corresponding sub alignment portions of the first alignment layer 11 of the lower panel 10 and corresponding sub alignment portions of the second alignment layer 21 of the upper panel 20, such that the viewing angle of the liquid crystal display may be increased as compared with a conventional liquid crystal display where the pixel area PA has a single domain.

If an alignment layer having different pretilts are disposed on only one of the lower panel 10 and the upper panel 20 and an alignment layer on the other one thereof has no pretilt, liquid crystal molecules adjacent to the other one of the lower panel 10 and the upper panel 20 are not pre-tilted and a response speed may be decreased.

In an exemplary embodiment the invention, the first alignment layer 11 of the lower panel 10 and the second alignment layer of the upper panel 20 have pretilts, such that the response speed of the liquid crystal molecules may be relatively improved.

Next, an exemplary embodiment of a method of providing or forming alignment layers 11 and 21 on the lower panel 10 and the upper panel 20 will be described with reference to FIGS. 6 to 9.

FIGS. 6 to 9 are perspective views showing an exemplary embodiment of a method of forming alignment layers of the lower panel of FIG. 3 and the upper panel of FIG. 4.

Here, an exemplary embodiment, where a photosensitive polymer layer is formed using an alignment material, polarized ultraviolet rays UV are used as light for photo-alignment, and photo-alignment polymers of the photosensitive polymer layer have directivity in a direction where the polarized ultraviolet rays UV are irradiated, will be described in detail. In such an embodiment, a wavelength of the polarized ultraviolet rays UV may be in a range of about 280 nanometers (nm) to about 340 nm.

In an alternative exemplary embodiment, photo-alignment polymers having directivity in an opposite direction to an irradiating direction of the polarized ultraviolet rays UV may be used. Further, in another alternative exemplary embodiment, another light instead of the ultraviolet rays UV or an ion beam may be used.

Figure 6:
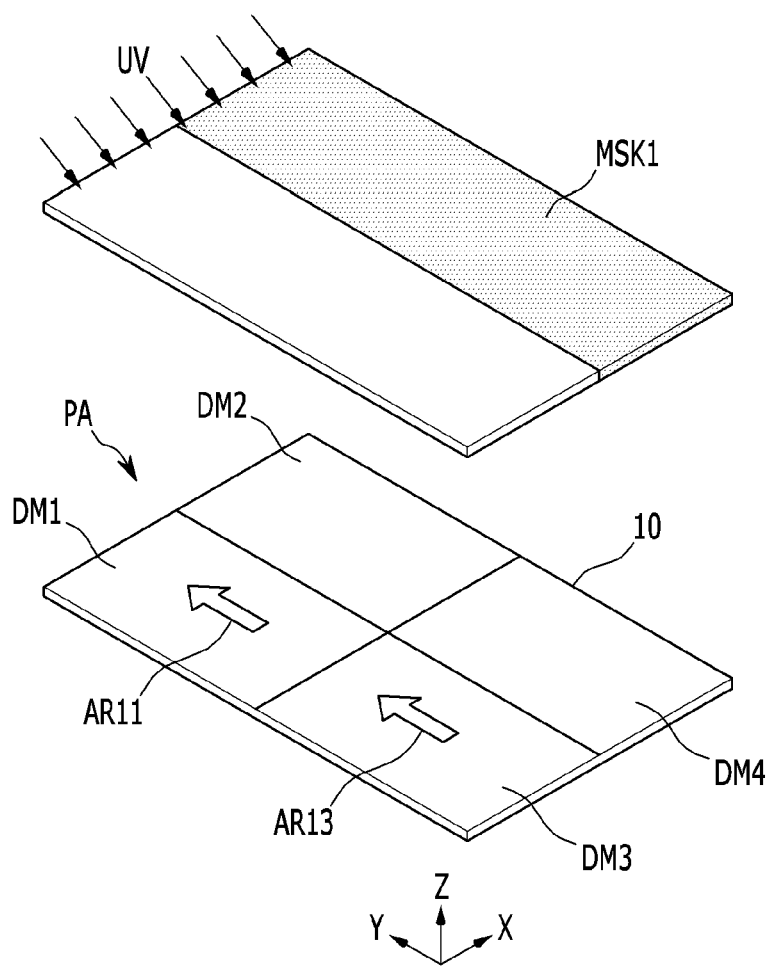
FIGS. 6 to 9 are perspective views showing an exemplary embodiment of a method of forming alignment layers of the lower panel of FIG. 3 and the upper panel of FIG. 4.

Referring to FIG. 6, after providing, e.g., forming, the photosensitive polymer layer on the lower panel 10, a first exposure process including disposing a first mask MSK1 on the lower panel 10 where the photosensitive polymer layer is provided and exposing the photosensitive polymer layer to the ultraviolet rays UV is performed.

The first mask MSK1 transmits ultraviolet rays UV in the portions of the photosensitive polymer layer on the lower panel 10 corresponding to the first domain DM1 and the third domain DM3 and shields ultraviolet rays UV in the portions of the photosensitive polymer layer on the lower panel 10 corresponding to the second domain DM2 and the fourth domain DM4. As a result, in the pixel area PA, the ultraviolet rays UV are irradiated to only the portions of the photosensitive polymer layer on the lower panel 10 corresponding to the first domain DM1 and the third domain DM3 and not irradiated to the portions of the photosensitive polymer layer on the lower panel 10 corresponding to the second domain DM2 and the fourth domain DM4. In such an embodiment, the ultraviolet rays is irradiated to a portion of the photosensitive polymer layer on the lower panel 10 corresponding to one domain of two domains DM1 and DM3 which divide the pixel area PA in the first direction X through the first mask MSK1.

In the first exposure process, the ultraviolet rays UV face a reverse direction −Y of the second direction Y when viewed from a plane where the first mask MSK1 is positioned and is tilted and irradiated in a third direction Z based on the plane where the first mask MSK1 is positioned. An angle at which the ultraviolet rays UV are tilted in the third direction Z based on the lower panel 10 may be substantially the same as the pretilt of the first alignment layer 11.

Directions of arrows AR11 and AR13 illustrated in FIG. 6 two-dimensionally represent directions in which the photosensitive polymer layer formed in each of the domains DM1 to DM4 is photo-aligned by the ultraviolet rays UV. In the first exposure process, the photosensitive polymer layer in the first domain DM1 and the third domain DM3, to which the ultraviolet rays UV are irradiated, reacts with the ultraviolet rays UV to be photo-aligned in the second direction Y, which is the irradiation direction of the ultraviolet rays UV. During the first exposure process, the photosensitive polymer layer in the second domain DM2 and the fourth domain DM4 where the ultraviolet rays UV are not irradiated is not photo-aligned.

Figure 7:
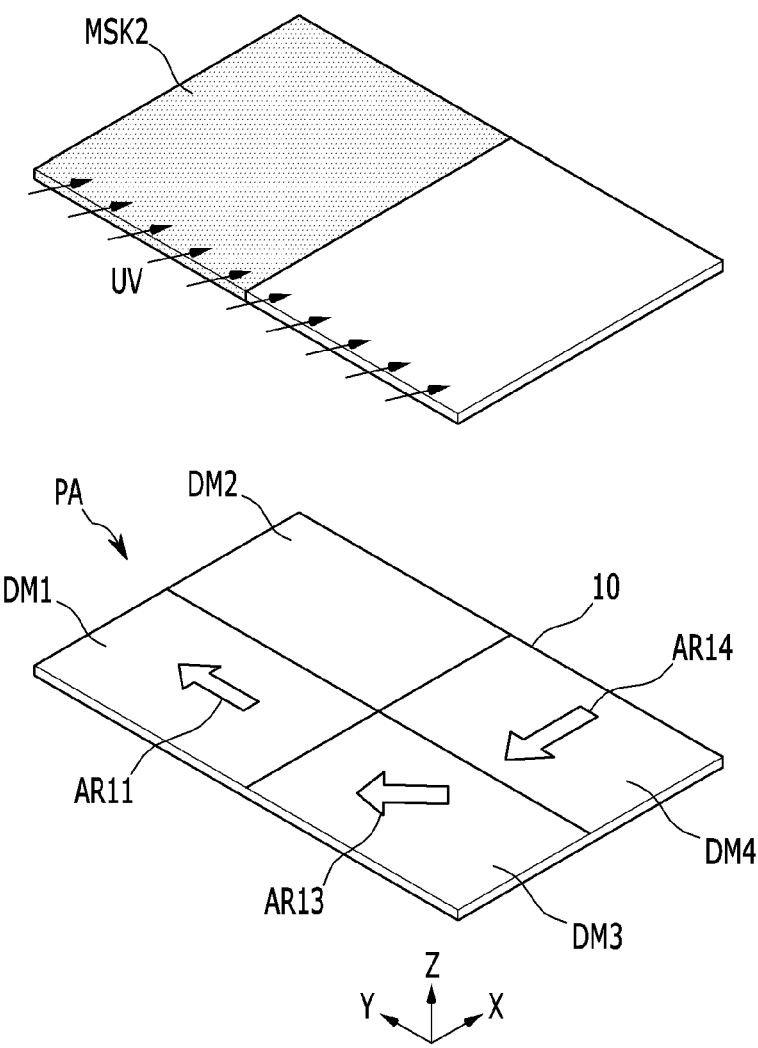

Referring to FIG. 7, a second exposure process including disposing a second mask MSK2 on the lower panel 10 where the photosensitive polymer layer is provided and exposing the photosensitive polymer layer to ultraviolet rays UV is performed.

The second mask MSK2 transmits ultraviolet rays UV in the portions of the photosensitive polymer layer on the lower panel 10 corresponding to the third domain DM3 and the fourth domain DM4 and shields ultraviolet rays UV in the portions of the photosensitive polymer layer on the lower panel 10 corresponding to the first domain DM1 and the second domain DM2. As a result, in the pixel area PA, the ultraviolet rays UV are irradiated to only the portions of the photosensitive polymer layer on the lower panel 10 corresponding to the third domain DM3 and the fourth domain DM4 and not irradiated to the portions of the photosensitive polymer layer on the lower panel 10 corresponding to the first domain DM1 and the second domain DM2. In the second exposure process, the ultraviolet rays are irradiated to one domain of two domains MD3 and DM4 which divide the pixel area PA in the second direction Y through the second mask MSK2.

In the second exposure process, the ultraviolet rays UV face the first direction X when viewed from a plane where the second mask MSK2 is positioned and is tilted and irradiated in a third direction Z based on the plane where the second mask MSK2 is positioned. An angle at which the ultraviolet rays UV are tilted in the third direction Z based on the lower panel 10 may be substantially the same as the pretilt of the first alignment layer 11.

Directions of arrows AR11, AR13 and AR14 illustrated in FIG. 7 two-dimensionally represent directions in which the photosensitive polymer layer formed in each of the domains DM1 to DM4 is photo-aligned by the ultraviolet rays UV. The photosensitive polymer layer formed in the third domain DM3 where the ultraviolet rays UV are irradiated is aligned in a direction which is a vector sum of the second direction Y which is the photo-aligned direction in the first exposure process and the reverse direction −X of the first direction X which is the photo-aligned direction in the second exposure process. Here, the direction which is the vector sum of the second direction Y and the reverse direction −X of the first direction X is a direction which is tilted at about 225° in the clockwise direction based on the first direction X on the plane of the lower panel 10. The photosensitive polymer layer in the fourth domain DM4, to which the ultraviolet rays UV are irradiated, reacts with the ultraviolet rays UV to be photo-aligned in the reverse direction −X of the first direction X which is the direction in which the ultraviolet rays UV are irradiated. In the second exposure process, the photo-alignment direction of the photosensitive polymer layer in the first domain DM1, to which the ultraviolet rays UV are not irradiated, is not changed, but maintained in the second direction Y which is the photo-aligned direction in the first exposure process. The photosensitive polymer layer in the second domain DM2 is not photo-aligned.

Figure 8:
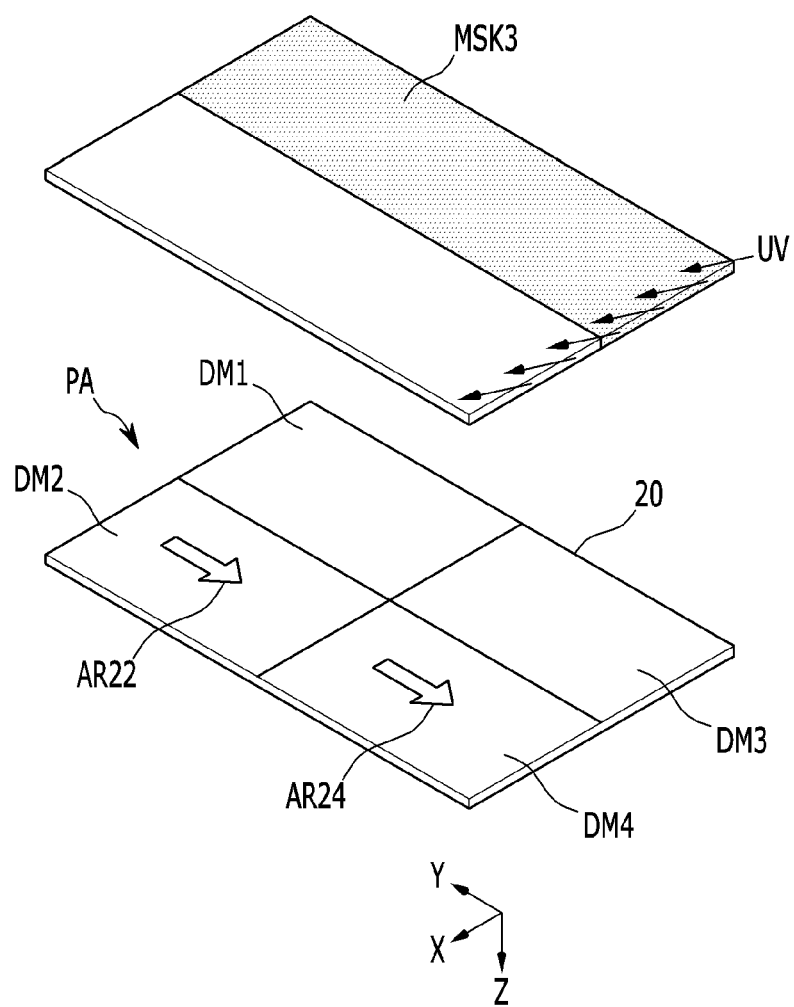

Referring to FIG. 8, after forming the photosensitive polymer layer on the upper panel 20, a third exposure process including disposing a third mask MSK3 on the upper panel 20 where the photosensitive polymer layer is provided and exposing the photosensitive polymer layer to the ultraviolet rays UV is performed.

Figure 9:
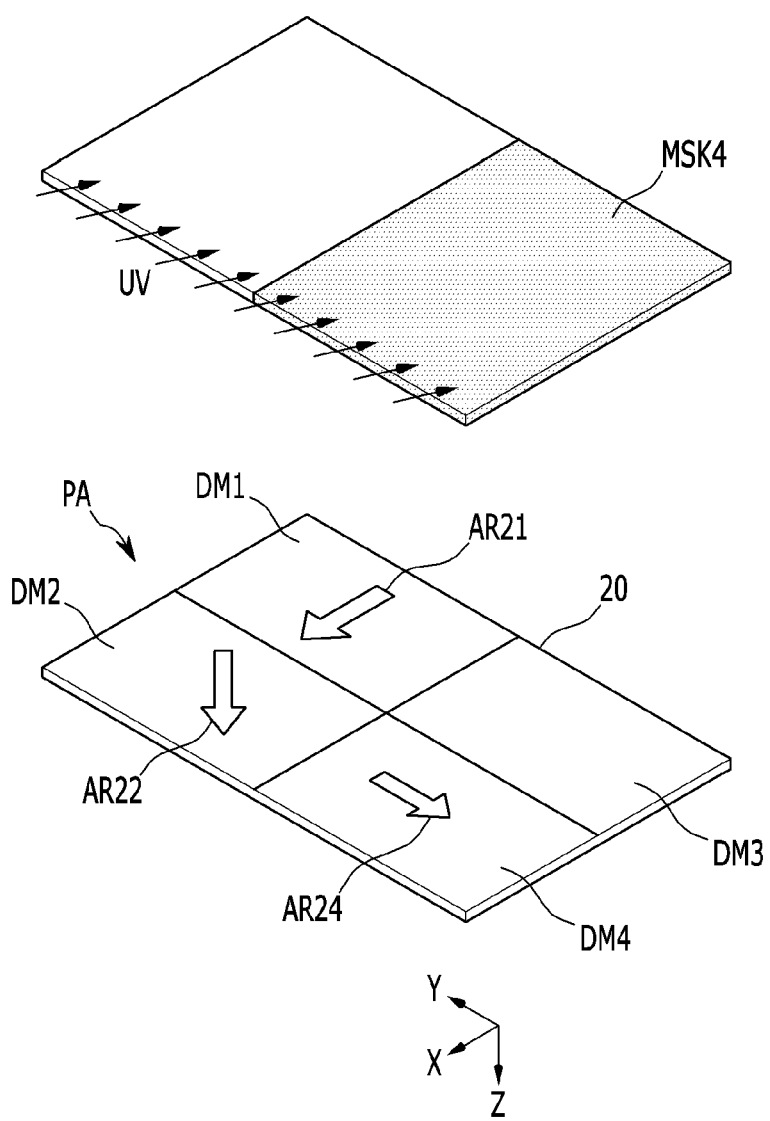

In the upper panel 20, since the second alignment layer 21 is provided on a surface facing the lower panel 10, FIGS. 8 and 9 illustrate the upper panel 20 in a reversed state (e.g., disposed upside down) in the exposure process.

The third mask MSK3 transmits ultraviolet rays UV in the portions of the photosensitive polymer layer on the upper panel 20 corresponding to the second domain DM2 and the fourth domain DM4 and shields the ultraviolet rays UV in the portions of the photosensitive polymer layer on the upper panel 20 corresponding to the first domain DM1 and the third domain DM3. As a result, in the pixel area PA, the ultraviolet rays UV are irradiated to only the portions of the photosensitive polymer layer on the upper panel 20 corresponding to the second domain DM2 and the fourth domain DM4 and not irradiated to the portions of the photosensitive polymer layer on the upper panel 20 corresponding to the first domain DM1 and the third domain DM3. That is, the ultraviolet rays UV are irradiated to the portions of the photosensitive polymer layer on the upper panel 20 corresponding to the other domain of two domains DM2 and DM4 which divide the pixel area PA in the first direction X through the third mask MSK3.

In the third exposure process, the ultraviolet rays UV face the second direction Y when viewed from a plane where the third mask MSK3 is positioned and is tilted and irradiated in a third direction Z based on the plane where the third mask MSK3 is positioned. An angle at which the ultraviolet rays UV are tilted in the third direction Z based on the upper panel 20 may be substantially the same as the pretilt angle of the second alignment layer 21.

Directions of arrows AR22 and AR24 illustrated in FIG. 8 two-dimensionally represent directions in which the photosensitive polymer layer formed in each of the domains DM1 to DM4 is photo-aligned by the ultraviolet rays UV. That is, the photosensitive polymer layer formed at the second domain DM2 and the fourth domain DM4 to which the ultraviolet rays UV is irradiated reacts with the ultraviolet rays UV to be photo-aligned in the reverse direction −Y of the second direction Y which is the direction in which the ultraviolet rays UV are irradiated. In the third exposure process, the photosensitive polymer layer formed in the first domain DM1 and the third domain DM3 where the ultraviolet rays UV are not irradiated is not photo-aligned.

Referring to FIG. 9, a fourth exposure process including disposing a fourth mask MSK4 on the upper panel 20 where the photosensitive polymer layer is provided and exposing the photosensitive polymer layer to ultraviolet rays UV is performed.

The fourth mask MSK4 transmits ultraviolet rays UV in the portions of the photosensitive polymer layer on the upper panel 20 corresponding to the first domain DM1 and the second domain DM2 and shields the ultraviolet rays UV in the portions of the photosensitive polymer layer on the upper panel 20 corresponding to the third domain DM3 and the fourth domain DM4. As a result, in the pixel area PA, the ultraviolet rays UV are irradiated to only the portions of the photosensitive polymer layer on the upper panel 20 corresponding to the first domain DM1 and the second domain DM2 and not irradiated to the portions of the photosensitive polymer layer on the upper panel 20 corresponding to the third domain DM3 and the fourth domain DM4. That is, the ultraviolet rays UV are irradiated to the portions of the photosensitive polymer layer on the upper panel 20 corresponding to the other domain of two domains DM1 and DM2 which divide the pixel area PA in the second direction Y through the fourth mask MSK4.

In the fourth exposure process, the ultraviolet rays UV face a reverse direction −X of the first direction X when viewed from a plane where the fourth mask MSK4 is positioned and is tilted and irradiated in a third direction Z based on the plane where the fourth mask MSK4 is positioned. An angle at which the ultraviolet rays UV is tilted in the third direction Z based on the upper panel 20 may be substantially the same as the pretilt angle of the second alignment layer 21.

Directions of arrows AR21, AR22, and AR24 illustrated in FIG. 9 two-dimensionally represent directions in which the photosensitive polymer layer formed in each of the domains DM1 to DM4 is photo-aligned by the ultraviolet rays UV. The photosensitive polymer layer formed in the first domain DM1 to which the ultraviolet rays UV are irradiated reacts with the ultraviolet rays UV to be photo-aligned in the first direction X which is the direction in which the ultraviolet rays UV are irradiated. The photosensitive polymer layer formed in the second domain DM2 where the ultraviolet rays UV are irradiated is aligned in a direction which is a vector sum of the reverse direction −Y of the second direction Y which is the photo-aligned direction in the third exposure process and the first direction X which is the photo-aligned direction in the fourth exposure process. Here, the direction which is the vector sum of the reverse direction −Y of the second direction Y and the first direction X is a direction which is tilted at about 45° in the clockwise direction based on the first direction X on the plane of the upper panel 20. In the fourth exposure process, the photo-alignment direction of the photosensitive polymer layer formed in the fourth domain DM4 to which the ultraviolet rays UV are not irradiated is not changed, but maintained in the reverse direction −Y of the second direction Y which is the photo-aligned direction in the third exposure process. The photosensitive polymer layer in the third domain DM3 is not photo-aligned.

In such an embodiment, when the photo-aligned lower panel 10 and upper panel 20 are coupled with each other, as illustrated in FIG. 5, the pretilt direction of the liquid crystal display is determined.

Referring back to FIGS. 6 to 9, in an exemplary embodiment, the exposure is performed once for the portions of the photosensitive polymer layer on the lower panel 10 in the first domain DM1 and the fourth domain DM4 of the lower panel 10 through the first exposure process and the second exposure process, and the exposure is performed two times for the portion of the photosensitive polymer layer on the lower panel 10 in the third domain DM3 through the first exposure process and the second exposure process. In such an embodiment, the exposure is performed once for the portions of the photosensitive polymer layer on the upper panel 20 in the first domain DM1 and the fourth domain DM4 of the upper panel 20 through the third exposure process and the fourth exposure process, and the exposure is performed twice once for the portion of the photosensitive polymer layer on the upper panel 20 in the second domain DM2. For a double exposure effect of the domains exposed to the exposure twice, an incident angle of the ultraviolet rays UV may be in a range of about 15° to about 90° in the first exposure process and the second exposure process (or in the third exposure process and the fourth exposure process). Further, exposure energy of ultraviolet rays UV may have a range of about 5 millijoule per square centimeter (mJ/cm$^2$) to about 100 mJ/cm$^2$, and the exposure energy of ultraviolet rays UV may be different from each other in the first exposure process and the second exposure process (or in the third exposure process and the fourth exposure process). The exposure energy of ultraviolet rays UV may be appropriately optimized based on a kind of photosensitive material.

In an exemplary embodiment, when the pixel area PA includes the domains defined by the photosensitive polymer layer which are exposed once and the domains which are exposed twice as described above, the response speed of the liquid crystal molecules may be improved and anchoring energy of the liquid crystal molecules may be improved, compared with a conventional method where the alignment layers having different pretilts are formed only on any one of the lower panel and the upper panel and the pretilt is not formed on the other panel. In an exemplary embodiment, a slit pattern or a protrusion pattern may not be defined or formed in the pixel electrode to improve the viewing angle, transmittance is not reduced by the slit pattern or the protrusion pattern, and as a result, transmittance of the liquid crystal display may be improved.

Figure 10:
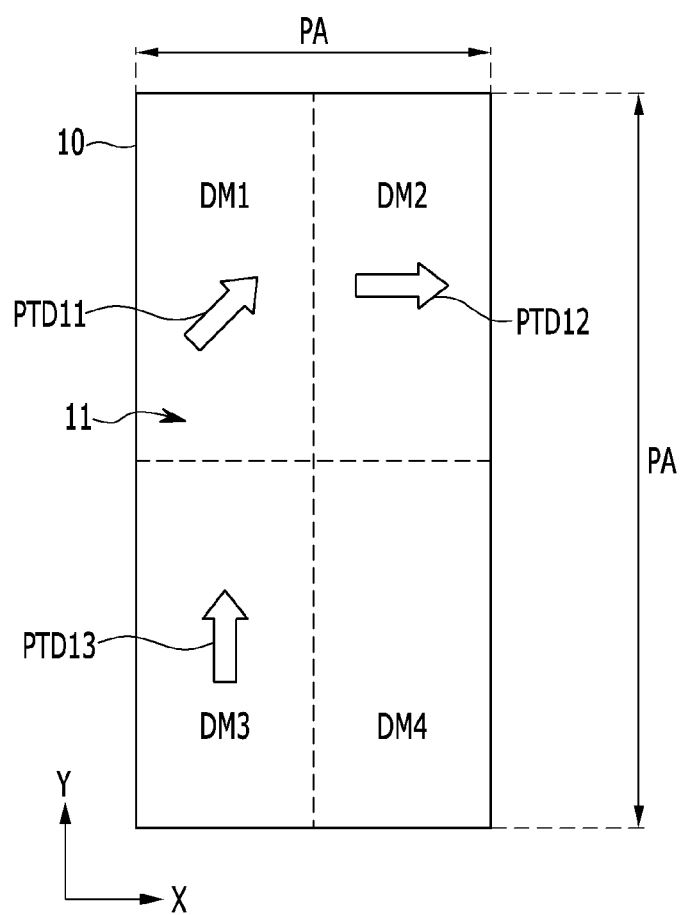
FIG. 10 is a plan view illustrating a first alignment layer of a lower panel in an alternative exemplary embodiment of a liquid crystal display according to the invention.
Figure 11:
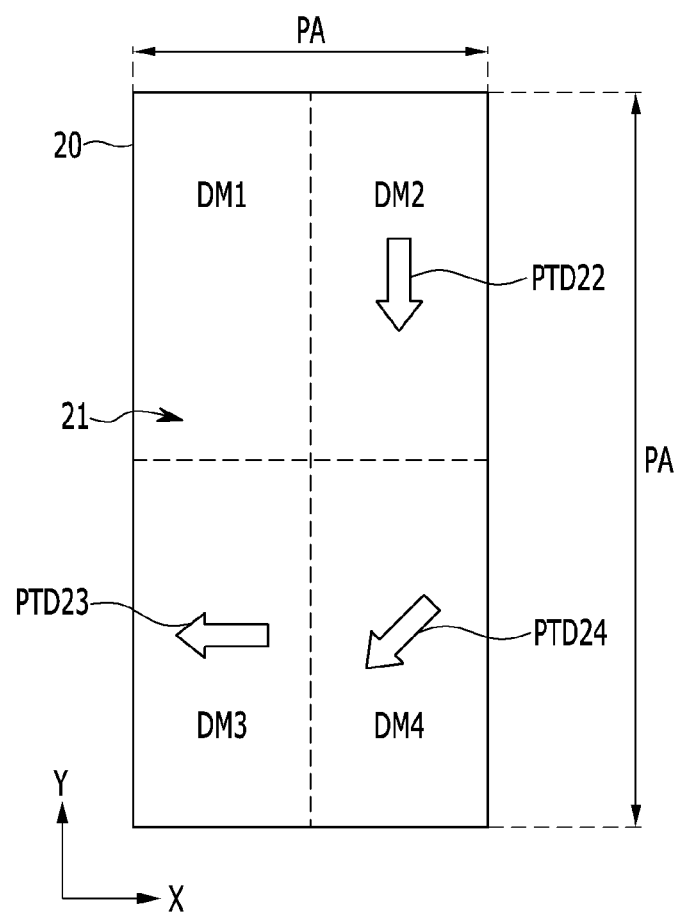
FIG. 11 is a plan view illustrating a second alignment layer of an upper panel in an alternative exemplary embodiment of a liquid crystal display according to the invention.
Figure 12:
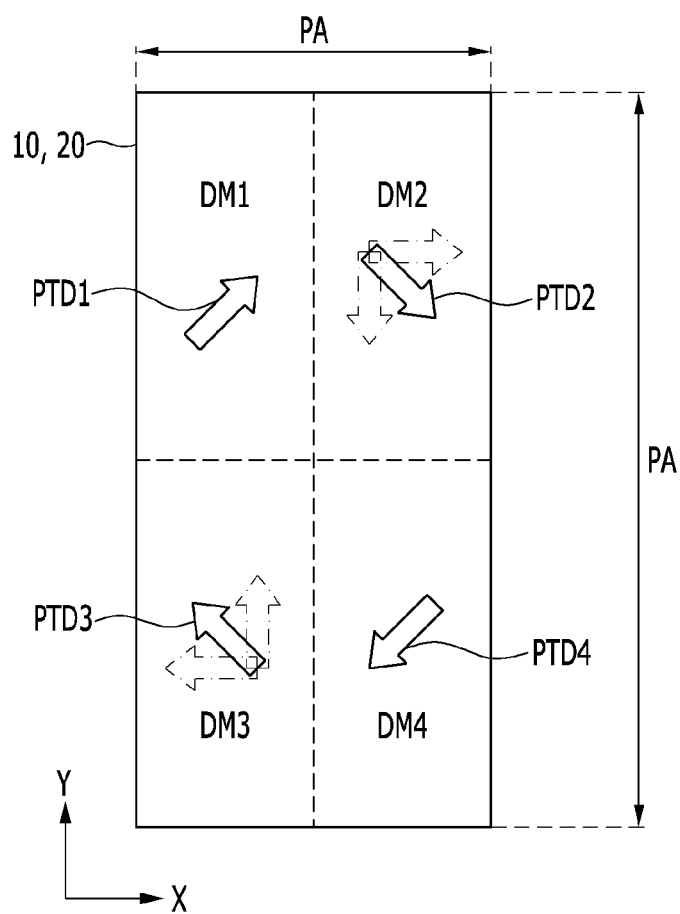
FIG. 12 is a plan view illustrating the lower panel of FIG. 10 and the upper panel of FIG. 11 which are disposed to overlap each other.

Hereinafter, a first alignment layer and a second alignment layer of an alternative exemplary embodiment of a liquid crystal display according to the invention will be described with reference to FIGS. 10 to 12. The first and second alignment layers in FIGS. 10 to 12 are substantially the same as first and second alignment layers show in FIGS. 3 to 5 except for the pretilt directions of first to fourth sub alignment portions corresponding to first to fourth domains DM1 to DM4. The same or like elements shown in FIGS. 10 to 12 have been labeled with the same reference characters as used above to describe the exemplary embodiments of The first and second alignment layers shown in FIGS. 3 to 5, and any repetitive detailed description thereof will hereinafter be omitted or simplified FIG. 10 is a plan view illustrating a first alignment layer of a lower panel in an alternative exemplary embodiment of a liquid crystal display according to the invention. FIG. 11 is a plan view illustrating a second alignment layer of an upper panel in an alternative exemplary embodiment of a liquid crystal display according to the invention. FIG. 12 is a plan view illustrating the lower panel of FIG. 10 and the upper panel of FIG. 11 which are disposed to overlap each other.

In an alternative exemplary embodiment, as illustrated in FIG. 10, pretilt directions of first to fourth sub alignment portions corresponding to first to fourth domains DM1 to DM4 in the lower panel 10 are different from those illustrated in FIG. 3. In such an embodiment, as shown in FIG. 10, the second sub alignment portion of the first alignment layer 11 has a pretilt direction PTD12 corresponding to the first direction X, the third sub alignment portion of the first alignment layer 11 has a pretilt direction PTD13 corresponding to the second direction Y, the first sub alignment portion of the first alignment layer 11 has a pretilt direction PTD11 corresponding to a direction of a vector sum of the pretilt direction PTD12 of the second sub alignment portion and the pretilt direction PTD13 of the third sub alignment portion, and the fourth sub alignment portion of the first alignment layer 11 does not have a pretilt.

In such an alternative exemplary embodiment, as illustrated in FIG. 11, pretilt directions of the first to fourth sub alignment portions corresponding to the first to fourth domains DM1 to DM4 in the upper panel 20 are different from those illustrated in FIG. 4. In such an embodiment, the second sub alignment portion of the second alignment layer 21 has a pretilt direction PTD22 corresponding to the reverse direction −Y of the second direction Y, the third sub alignment portion of the second alignment layer 21 has a pretilt direction PTD23 corresponding to the reverse direction −X of the first direction X, the fourth sub alignment portion of the second alignment layer 21 has a pretilt direction PTD24 corresponding to a direction of a vector sum of the pretilt direction PTD22 of the second sub alignment portion and the pretilt direction PTD23 of the third sub alignment portion, and the first sub alignment portion of the second alignment layer 21 does not have a pretilt.

As illustrated in FIG. 12, when the lower panel 10 and the upper panel 20 are coupled with each other, the domains corresponding to the second sub alignment portion and the third sub alignment portion have pretilt directions PTD2 and PTD3 of a vector sum direction of the corresponding pretilt direction of the lower panel 10 and the corresponding pretilt direction of the upper panel 20, respectively. In such an embodiment, since the fourth sub alignment portion of the lower panel 10 does not have the pretilt, the domain corresponding to the fourth sub alignment portion has the pretilt direction PTD4 in the same direction as the pretilt direction PTD24 of the fourth sub alignment portion of the upper panel 20. In such an embodiment, since the first sub align-ment portion of the upper panel 20 does not have the pretilt, the domain corresponding to the first sub alignment portion has the pretilt direction PTD1 in the same direction as the pretilt direction PTD11 of the first sub alignment portion of the lower panel 10.

As a result, the first to fourth pretilt directions PTD1 to PTD4 of the domains corresponding to the first sub alignment portion to the fourth sub alignment portion are arranged in a rotating form in a clockwise direction by coupling the lower panel 10 and the upper panel 20, which is the same as the pretilt direction of FIG. 5.

An exemplary embodiment of a manufacturing method of the lower panel 10 and the upper panel 20 of FIGS. 10 and 11 is substantially the same as the exemplary embodiments of the manufacturing method of the lower panel 10 and the upper panel 20 described in FIGS. 6 to 10, except that domains irradiated by the ultraviolet rays UV, and the detailed description of an exemplary embodiment of the manufacturing method of the lower panel 10 and the upper panel 20 of FIGS. 10 and 11 will be omitted.

Figure 13:
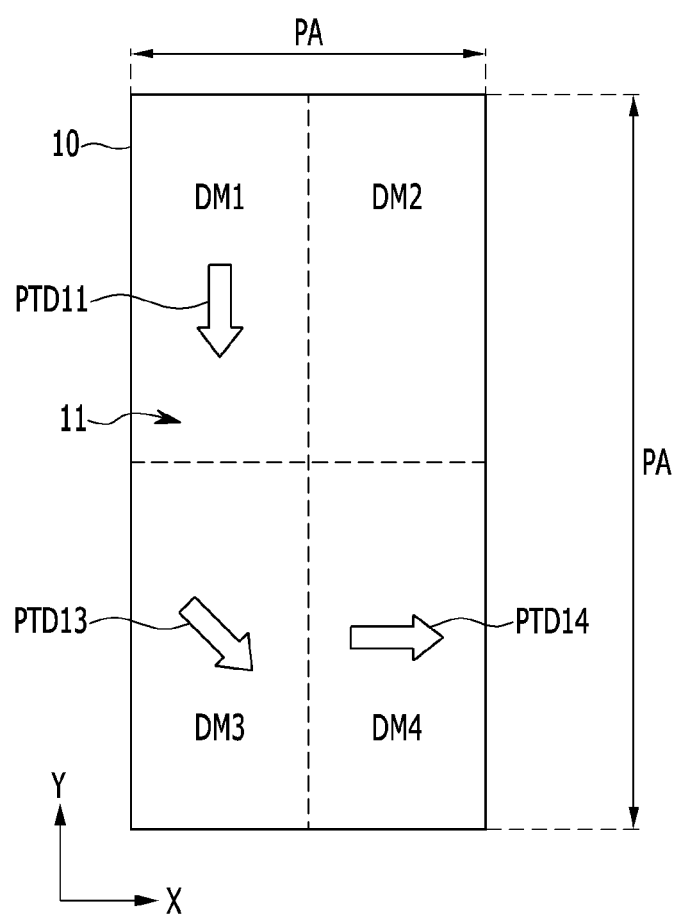
FIG. 13 is a plan view illustrating a first alignment layer of a lower panel in another alternative exemplary embodiment of a liquid crystal display according to the invention.
Figure 14:
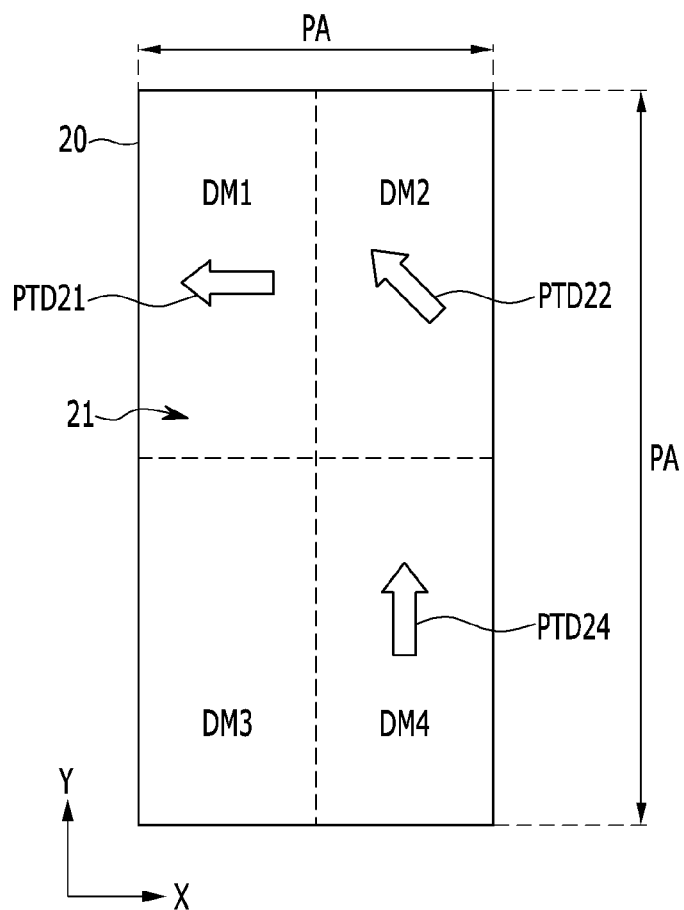
FIG. 14 is a plan view illustrating a second alignment layer of an upper panel in another alternative exemplary embodiment of a liquid crystal display according to the invention.
Figure 15:
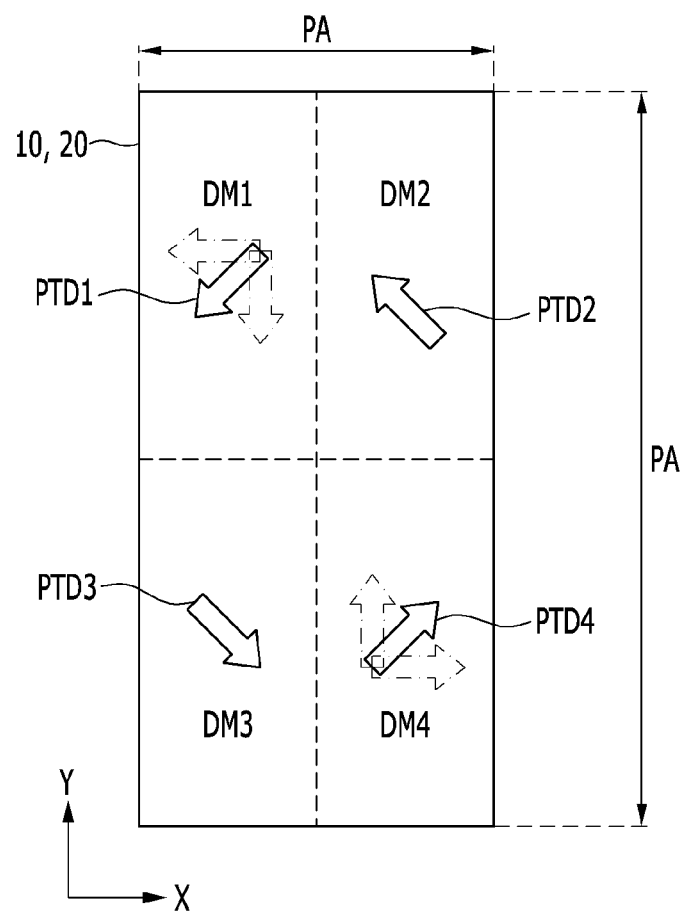
FIG. 15 is a plan view illustrating the lower panel of FIG. 13 and the upper panel of FIG. 14 which are disposed to overlap each other.

Hereinafter, a first alignment layer and a second alignment layer of another alternative exemplary embodiment of a liquid crystal display according to the invention will be described with reference to FIGS. 13 to 15. The first and second alignment layers in FIGS. 13 to 15 are substantially the same as first and second alignment layers show in FIGS. 3 to 5 except for the pretilt directions of first to fourth sub alignment portions corresponding to first to fourth domains DM1 to DM4. The same or like elements shown in FIGS. 13 to 15 have been labeled with the same reference characters as used above to describe the exemplary embodiments of The first and second alignment layers shown in FIGS. 3 to 5, and any repetitive detailed description thereof will hereinafter be omitted or simplified.

FIG. 13 is a plan view illustrating a first alignment layer of a lower panel in another alternative exemplary embodiment of a liquid crystal display according to the invention. FIG. 14 is a plan view illustrating a second alignment layer of an upper panel in another alternative exemplary embodiment of a liquid crystal display according to the invention. FIG. 15 is a plan view illustrating the lower panel of FIG. 13 and the upper panel of FIG. 14 which are disposed to overlap each other.

In such an embodiment, as illustrated in FIG. 13, pretilt directions of first to fourth sub alignment portions corresponding to first to fourth domains DM1 to DM4 in the lower panel 10 are different from those illustrated in FIG. 3. In such an embodiment, the first sub alignment portion of the first alignment layer 11 has a pretilt direction PTD11 corresponding to the reverse direction −Y of the second direction Y, the fourth sub alignment portion of the first alignment layer 11 has a pretilt direction PTD14 corresponding to the first direction X, the third sub alignment portion of the first alignment layer 11 has a pretilt direction PTD13 corresponding to a direction of a vector sum of the pretilt direction PTD11 of the first sub alignment portion and the pretilt direction PTD14 of the fourth sub alignment portion, and the second sub alignment portion of the first alignment layer 11 does not have a pretilt.

In such an embodiment, as illustrated in FIG. 14, pretilt directions of the first to fourth sub alignment portions corresponding to the first to fourth domains DM1 to DM4 in the upper panel 20 are different from those illustrated in FIG. 4. In such an embodiment, the first sub alignment portion of the second alignment layer 21 has a pretilt direction PTD21 corresponding to the reverse direction −X of the first direction X, the fourth sub of the second alignment layer 21 alignment portion has a pretilt direction PTD24 corresponding to the second direction Y, the second sub alignment portion of the second alignment layer 21 has a pretilt direction PTD22 corresponding to a direction of a vector sum of the pretilt direction PTD21 of the first sub alignment portion and the pretilt direction PTD24 of the fourth sub alignment portion, and the third sub alignment portion of the second alignment layer 21 does not have a pretilt.

As illustrated in FIG. 15, when the lower panel 10 and the upper panel 20 are coupled with each other, the domains corresponding to the first sub alignment portion and the fourth sub alignment portion have the pretilt directions PTD1 and PTD4 of a vector sum direction of the corresponding pretilt direction of the lower panel 10 and the corresponding pretilt direction of the upper panel 20, respectively. In such an embodiment, since the second sub alignment portion of the lower panel 10 does not have the pretilt, the second sub alignment portion has the pretilt direction PTD2 in the same direction as the pretilt direction PTD22. In such an embodiment, since the third sub alignment portion of the upper panel 20 does not have the pretilt, the third sub alignment portion has the pretilt direction PTD3 in the same direction as the pretilt direction PTD13 of the lower panel 10.

As a result, the first to fourth pretilt directions PTD1 to PTD4 of the domains corresponding to the first sub alignment portion to the fourth sub alignment portion are arranged in a rotating form in a counterclockwise direction by coupling the lower panel 10 and the upper panel 20. In such an embodiment, the first to fourth pretilt directions PTD1 to PTD4 are different from the first to fourth pretilt directions arranged to rotate in the clockwise direction of FIG. 5.

A manufacturing method of the lower panel 10 and the upper panel 20 of FIGS. 13 and 14 are substantially the same as the manufacturing method described in FIGS. 6 to 9 except that directions irradiating the ultraviolet rays UV and a photo-alignment direction, and the detailed description of the manufacturing method of the lower panel 10 and the upper panel 20 of FIGS. 13 and 14 will be omitted.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
    a lower panel in which a plurality of pixel areas is defined;
    an upper panel disposed opposite to the lower panel and in which the plurality of pixel areas is defined, wherein each pixel area is divided into first to fourth domains;
    a first alignment layer disposed on the lower panel and photo-aligned to have first to fourth sub alignment portions corresponding to the first to fourth domains, respectively; and
    a second alignment layer disposed on the upper panel and photo-aligned to have first to fourth sub alignment portions corresponding to the first to fourth domains, respectively,
    wherein one sub alignment portion of the first to fourth sub alignment portions of the first alignment layer has no pretilt and remaining sub alignment portions of the first to fourth sub alignment portions of the first alignment layer has different pretilt directions from each other, and
    wherein one sub alignment portion of the first to fourth sub alignment portions of the second alignment layer has no pretilt and remaining sub alignment portions of the first to fourth sub alignment portions of the second alignment layer has different pretilt directions from each other,
    wherein
    the first domain is positioned at an upper left side in each pixel area,
    the second domain is positioned at an upper right side in each pixel area,
    the third domain is positioned at a lower left side in each pixel area, and
    the fourth domain is positioned at a lower right side in each pixel area, and
    wherein
    the one sub alignment portion of the second alignment layer having no pretilt is adjacent to the one sub alignment portion of the first alignment layer having no pretilt in a diagonal direction.

2. The liquid crystal display of claim 1, wherein
    a pretilt direction of a sub alignment portion of the first alignment layer adjacent to the one sub alignment portion of the first alignment layer having no pretilt in the diagonal direction is a vector sum direction of pretilt directions of the other two remaining sub alignment portions of the first alignment layer.

3. The liquid crystal display of claim 2, wherein
    the sub alignment portion of the first alignment layer adjacent to the one sub alignment portion of the first alignment layer having no pretilt in the diagonal direction is a region in which an exposure is performed twice on the lower panel, and
    the other two remaining sub alignment portions of the first alignment layer are regions in which the exposure is performed once on the lower panel.

4. The liquid crystal display of claim 2, wherein
    a pretilt direction of a sub alignment portion of the second alignment layer adjacent to the one sub alignment portion of the second alignment layer having no pretilt in the diagonal direction is a vector sum direction of pretilt directions of the other two remaining sub alignment portions of the second alignment layer.

5. The liquid crystal display of claim 4, wherein
    the sub alignment portion of the second alignment layer adjacent to the one sub alignment portion of the second alignment layer having no pretilt in the diagonal direction is a region in which an exposure is performed twice on the upper panel, and
    the other two remaining sub alignment portions of the second alignment layer are regions in which the exposure is performed once on the upper panel.

6. The liquid crystal display of claim 4, wherein
    a pretilt direction of a domain of the first to fourth domains is determined by a vector sum direction of pretilt directions of corresponding sub alignment portions of the first alignment layer and the second alignment layer.

7. The liquid crystal display of claim 6, wherein
    pretilt directions in the first to fourth domains are arranged to rotate in a clockwise direction with respect to a center of the pixel area.

8. The liquid crystal display of claim 6, wherein
    pretilt directions in the first to fourth domains are arranged to rotate in a counterclockwise direction with respect to a center of the pixel area.

* * * * *